Patented Jan. 6, 1931

1,788,297

UNITED STATES PATENT OFFICE

RICHARD HERZ, OF FRANKFORT-ON-THE-MAIN, AND MAX SCHUBERT, OF FRANKFORT-ON-THE-MAIN/FECHENHEIM, GERMANY, ASSIGNORS TO GENERAL ANILINE WORKS, INC., OF NEW YORK, N. Y., A CORPORATION OF DELAWARE

PROCESS FOR MANUFACTURING ORTHO-AMINO-ARYL MERCAPTANES AND PRODUCTS PRODUCED THEREBY

No Drawing. Application filed July 6, 1928, Serial No. 290,881, and in Germany July 9, 1927.

Our present invention has for its subject a new, useful and very widely applicable process for the manufacture of ortho-amino-aryl mercaptanes. This process consists in treating at an elevated temperature an aryl-thiazolic compound of the general formula:

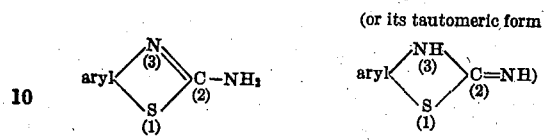

wherein aryl means a substituted residue of the benzene series, or a residue of the naphthalene or anthracene series, substituted or not substituted, with a concentrated caustic alkali solution with or without the addition of an organic diluent, particularly of an alcohol, whereby the thiazol ring is split off and ortho-amino-arylmercaptanes of the formula:

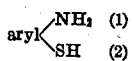

wherein aryl has the aforesaid signification, are formed.

It is a remarkable fact that the reaction is effected very smoothly and without a material formation of by-products, whereas A. W. Hofmann (Berichte der deutschen chemischen Gesellschaft, Vol. 13, page 8 ff.) found that 2-aminobenzothiazol remains unchanged when boiled with a caustic alkali solution and could succeed in splitting off the thiazol ring only by subjecting the thiazolic compound to the caustic alkali fusion, a method which is not suitable for producing substituted amino-arylmercaptanes as undesired by-products are formed diminishing essentially the yield of pure products.

The present process is particularly applicable when starting from 2-aminothiazol compounds, in which the paraposition to the azole nitrogen atom is either substituted by a monovalent radicle or blockaded, which are easily obtainable by acting in an acidic medium with an inorganic sulfocyanide in the presence of a halogen on the corresponding primary aryl-amines according to U. S. application of Kaufmann and Schubert, Serial No. 183,228, filed April 12, 1927.

The ortho-aminoarylmercaptanes obtained according to our new process have all characteristic properties of this important class of intermediates for the production of dyestuffs of the thioindigo series, particularly they form with solutions of salts of heavy metals difficultly soluble mercaptides and yield in a smooth reaction the corresponding ortho-aminoarylthioglycolic acids when condensed with monochloroacetic acid. Advantageously one may directly use for this latter condensation the alkaline solutions of the mercapto-compounds obtained according to our process without isolating the mercaptanes themselves.

In order to further illustrate our invention the following examples are given, the parts being by weight and all temperatures in centigrade degrees, but it is understood, that our invention is not limited to the particular products or reacting conditions mentioned therein.

Example 1

5 parts of 2-amino-4-methyl-6-chlorobenzothiazol of the probable formula

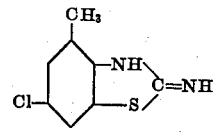

obtainable, for instance, by acting with bromine on a mixture of 1-methyl-2-amino-5-chlorobenzene and sodium sulfocyanide in an acetic acid solution are boiled in a vessel provided with a reflux condenser with 100 parts of a caustic potash solution of 50% strength for about 5 hours. After cooling down the mass the potassium salt of the 1-methyl-2-amino-5-chloro-benzene-3-mercaptane of the formula:

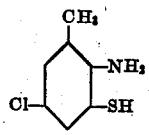

separates and may be isolated in the usual manner. When condensing the solution of the potassium mercaptide in the usual manner with the corresponding quantity of the sodium salt of the monochloracetic acid, the 1-methyl-2-amino-5-chlorobenzene-3-thioglycolic acid is obtained in a pure state with an excellent yield, it may be isolated in the form of its inner anhydride melting at 186° and corresponding probably to the formula:

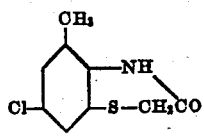

Example 2

5 parts of 2-amino-6-ethoxybenzothiazol of the probable formula:

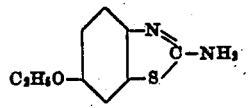

obtainable, for instance, by acting with bromine on a mixture of para-phenetidine and sodium sulfocyanide in an acetic acid solution are boiled for about 7 hours with 100 parts of a caustic soda solution of about 50° Bé. in a vessel provided with a reflux condenser. After cooling down the sodium salt of 1-amino-4-ethoxybenzene-2-mercaptane of the formula:

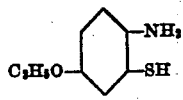

separates and may be isolated in the usual manner. When condensing the solution of the mercaptide with the calculated quantity of monochloracetic acid (sodium salt) the corresponding 1-amino-4-ethoxybenzene-2-thioglycolic acid is obtained in an excellent yield, which likewise may be isolated in form of its inner anhydride.

Example 3

12 parts of 2-amino-4.5-benzo-6-ethoxybenzothiazol of the probable formula:

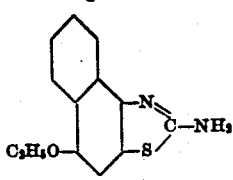

of 205° melting point, obtainable, for instance, by the action of bromine on 4-ethoxy-1-aminonaphthalene and sodium sulfocyanide in an acidic medium, are boiled under reflux for about 4 hours with a solution of 70 parts of caustic potash in about 50 parts of water, an addition of a reducing agent such as sodium sulfide or hydrosulfite or zinc dust being advisable for preventing the oxidation of the mercaptane formed. When the reaction is finished the mass is diluted with about the double quantity of water and if it is desired to isolate the mercaptane compound, the mass is poured into an acetic acid solution of zinc chloride, whereby the 4-amino-1-ethoxy-3-thionaphthol formed of the formula:

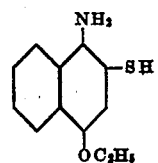

precipitates as zinc salt. It is a new compound not hitherto described in literature. For the production of the corresponding thioglycolic acid the aforesaid diluted reaction mass, containing the sodium salt of the new mercaptane, is directly condensed at about 40–50° with the corresponding quantity of the sodium salt of mono-chloroacetic acid. The 4-amino-1-ethoxy-3-naphthyl-thioglycolic acid of the formula:

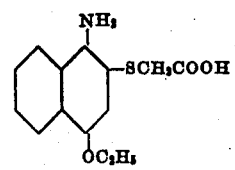

(which is likewise a new compound) is thus obtained as sodium salt separating out in form of colorless leaflets from the cooled reaction solution. By acidifying the aqueous solution of the sodium salt the anhydride of the new thioglycolic acid is obtained crystallizing from spirit as colorless needles of 227–228° melting point.

When starting from 2-amino-4.5-benzo-6-methoxy-benzothiazol of 225° melting point in the same manner the corresponding 4-amino-1-methoxy-3-thionaphthol is formed yielding likewise by condensation with monochloracetic acid (sodium salt) the 4-amino-1-methoxy-3-naphthyl-thioglycolic acid, the inner anhydride of which is obtained as colorless needles, melting at 226–227°, when recrystallized for instance from alcohol.

In the same manner the 2-amino-alpha-beta-anthracylthiazole obtainable, for instance, by the action of bromine on beta-anthramine and potassium sulfocyanide in an acidic medium yields the corresponding 2-aminoanthracene-1-mercaptane.

We claim:

1. A process which comprises treating at a temperature exceeding 100° a 2-amino-arylthiazolic compound of the general formula:

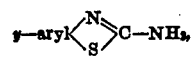

wherein aryl means a substituted residue of the benzene series or a residue of the naphthalene or anthracene series substituted or not and wherein y means that in the benzene nucleus adjacent to the thiazol-ring the 4-position to the azole nitrogen atom is either substituted or blockaded with a concentrated caustic alkali solution.

2. A process which comprises treating at about 120–160° a 2-amino-arylthiazolic compound of the general formula:

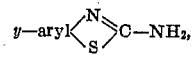

wherein aryl means a substituted residue of the benzene series or a residue of the naphthalene or anthracene series substituted or not and wherein $y$ means that in the benzene nucleus adjacent to the thiazol-ring the 4-position to the azole nitrogen atom is either substituted or blockaded, with a concentrated caustic alkali solution.

3. As new compounds o-amino-mercaptanes of the general formula:

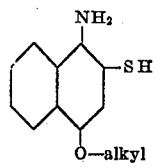

forming insoluble heavy metal salts and yielding the corresponding new ortho-amino-thioglycolic acids by condensation with monochloroacetic acid.

4. As a new compound the 1-ethoxy-4-amino-3-thionaphthol of the formula:

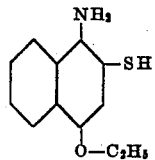

forming insoluble heavy metal salts and yielding when condensed with monochloracetic acid the new 1-ethoxy-4-aminonaphthalene-3-thioglycolic acid, the anhydride of which melts at 227–228° in a pure state.

In testimony whereof, we affix our signatures.

RICHARD HERZ.
MAX SCHUBERT.